(12) United States Patent
Tiwari et al.

(10) Patent No.: US 11,810,209 B2
(45) Date of Patent: Nov. 7, 2023

(54) OUTAGE RESTORATION TIME PREDICTION DURING WEATHER EVENTS AND OPTIMIZED SOLUTIONS FOR RECOVERY

(71) Applicant: INTERNATIONAL BUSINESS MACHINES CORPORATION, Armonk, NY (US)

(72) Inventors: Pranshu Tiwari, Delhi (IN); Atul Kumar Thapliyal, Dwarka (IN); Harish Bharti, Pune (IN); Abhay Kumar Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 17/089,759

(22) Filed: Nov. 5, 2020

(65) Prior Publication Data

US 2022/0138871 A1    May 5, 2022

(51) Int. Cl.
*G06Q 50/06*    (2012.01)
*G06N 3/126*    (2023.01)
(Continued)

(52) U.S. Cl.
CPC .......... *G06Q 50/06* (2013.01); *G06F 18/214* (2023.01); *G06F 18/24* (2023.01); *G06N 3/126* (2013.01); *G06N 7/01* (2023.01); *G01W 1/10* (2013.01)

(58) Field of Classification Search
CPC ....... G06Q 50/06; G06F 18/214; G06F 18/24; G06N 3/126; G06N 7/01; G06N 5/01;
(Continued)

(56) References Cited

U.S. PATENT DOCUMENTS 7,010,437 B2    3/2006  Lubkeman
9,230,289 B2    1/2016  Omitaomu
(Continued)

OTHER PUBLICATIONS

Arif et al., "Distribution Network Outage Data Analysis and Repair Time Prediction Using Deep Learning", PMAPS 2018, © 2018 IEEE, 6 pages.
(Continued)

*Primary Examiner* — Mohammad Ali
*Assistant Examiner* — Saad M Kabir
(74) *Attorney, Agent, or Firm* — Steven M. Bouknight

(57) ABSTRACT

A method, a computer system, and a computer program product for restoration time predictions and optimized recovery solutions is provided. Embodiments of the present invention may include selecting a dataset based on time series data. Embodiments of the present invention may include building one or more models, wherein the one or more models include a classification and regression tree model, a cross validated decision tree model or a bootstrap aggregating model. Embodiments of the present invention may include selecting a model for predictions using decision trees to reduce a variance of the model. Embodiments of the present invention may include rebuilding the model based on additional data attributes. Embodiments of the present invention may include determining an outage prioritization for each outage node. Embodiments of the present invention may include transmitting results of the outage prioritization.

20 Claims, 6 Drawing Sheets

(51) Int. Cl.
  *G06F 18/24* (2023.01)
  *G06F 18/214* (2023.01)
  *G06N 7/01* (2023.01)
  *G01W 1/10* (2006.01)

(58) Field of Classification Search
  CPC .... G06N 20/20; G01W 1/10; G01W 2203/00; Y02A 90/10
  USPC .......................................................... 700/291
  See application file for complete search history.

(56) References Cited

U.S. PATENT DOCUMENTS

| | | | |
|---|---|---|---|
| 2006/0217936 A1 | 9/2006 | Mason, Jr. | |
| 2010/0152910 A1 | 6/2010 | Taft | |
| 2012/0010830 A1* | 1/2012 | Saarinen | G01R 31/58 702/58 |
| 2012/0265502 A1* | 10/2012 | Omitaomu | G06Q 50/06 703/2 |
| 2018/0018590 A1* | 1/2018 | Szeto | G06N 20/10 |

OTHER PUBLICATIONS

Arif, "Distribution system outage management after extreme weather events", Iowa State University, Digital Repository, Graduate Theses and Dissertations, 2019, Iowa Stae University Capstones, 139 pages.

Davidson, "Workshop for Research in Electricity Infrastructure Hardening", https://warrington.ufl.edu/centers/purc/docs/abstract_2006Davidson.pdf, Jun. 9, 2006, Gainesville, FL, Sponsored by: Public Utility Research Center and University of Florida, pp. 1-2.

Duffey et al., The Probability and Timing of Power System Restoration, IEEE Transactions on Power Systems, vol. 28, No. 1, Feb. 2013, pp. 3-9.

Giordano et al., "Powering larger insights while preserving privacy", Technology innovation blog, Accenture, Jan. 30, 2020, https://www.accenture.com/us-en/blogs/technology-innovation, 3 pages.

Liu et al., "Statistical Forecasting of Electric Power Restoration Times in Hurricanes and Ice Storms", IEEEtransactions on Power Systems, vol. 22, No. 4, Nov. 2007, pp. 2270-2279.

Nateghi et al., "Forecasting hurricane-induced power outage durations", Nat Hazards (2014) 74:1795-1811, Accepted: Jun. 2, 2014 / Published online: Jun. 14, 2014 © Springer Science+Business Media Dordrecht 2014.

Wanik et al., "Estimated Time of Restoration (ETR) Guidance for Electric Distribution Networks", Journal of Homeland Security and Emergency Management. 2018; 20160063, De Gruyer, pp. 1-13.

Mell et al., "The NIST Definition of Cloud Computing", Recommendations of the National Institute of Standards and Technology, Special Publication 800-145, Sep. 2011, 7 pages.

* cited by examiner

OUTAGE RESTORATION TIME PREDICTION DURING WEATHER EVENTS AND OPTIMIZED SOLUTIONS FOR RECOVERY

BACKGROUND

The present invention relates generally to the field of computing, and more particularly to machine learning. Extreme weather events create an environment that is challenging to provide accurate regional and customer-specific restoration times. During normal weather conditions, organizations can provide a fairly accurate estimated time of restoration (ETR) or an expected restoration time (ERT) using automated outage reporting systems.

SUMMARY

Embodiments of the present invention disclose a method, a computer system, and a computer program product for restoration time predictions and optimized recovery solutions. Embodiments of the present invention may include selecting a dataset based on time series data. Embodiments of the present invention may include building one or more models, wherein the one or more models include a classification and regression tree model, a cross validated decision tree model or a bootstrap aggregating model. Embodiments of the present invention may include selecting a model for predictions using decision trees to reduce a variance of the model. Embodiments of the present invention may include rebuilding the model based on additional data attributes. Embodiments of the present invention may include determining an outage prioritization for each outage node. Embodiments of the present invention may include transmitting results of the outage prioritization.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
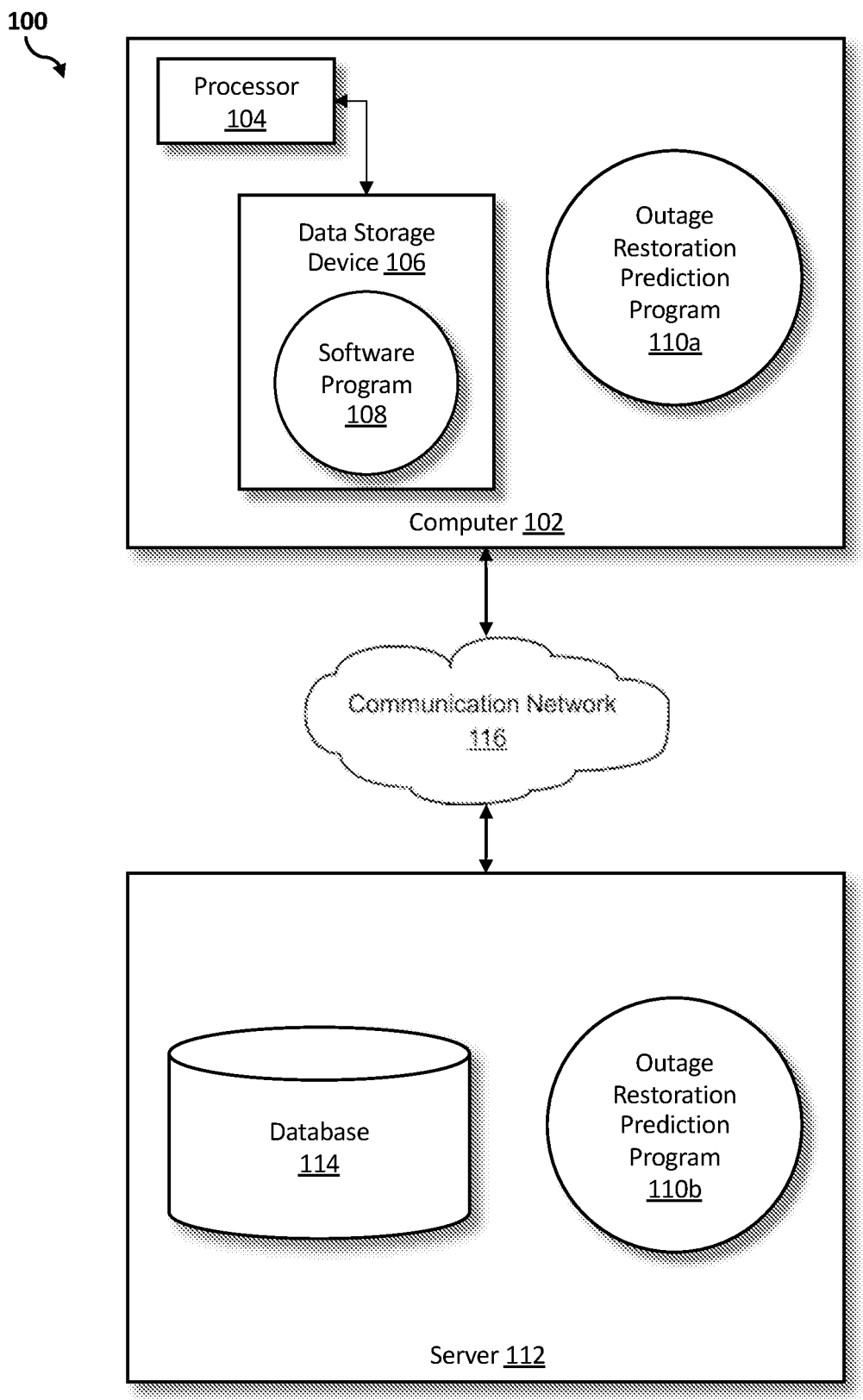
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, extreme weather events create an environment that is challenging to provide accurate regional and customer-specific restoration times. During normal weather conditions, organizations can provide a fairly accurate estimated time of restoration (ETR) or an expected restoration time (ERT) using automated outage reporting systems. However, during weather events that may cause widespread damage and outages, many challenges occur that do not allow for accurate regional and customer specific restoration times. Even if the damage from the weather event is analyzed by experienced damage assessment crews, upon arrival of field teams, the field teams can find many new or unexpected issues and damage. Inaccurate or a large amount of notifications can lead to inefficient recover times and many displaced individuals or customers without services.

The inaccuracies and the large amount of incorrect and untimely outage notifications relating to the estimated time of restoration (ETR) or an expected restoration time (ERT) cause individuals living in the region to be displaced longer without proper services. Additionally, the slow recovery process can be more harmful to the public or more costly to the individuals and companies awaiting assistance. Dispatch engineers allocate outages to different recovery field technicians based on inaccurate information which also leads to inefficient and lengthy outage restoration management.

An example of the current process for emergency events may include many different phases that can affect the response time by the proper authority. For example, customers, authorities or field crew may report preliminary damage information by many methods from a phone call, a utility or government website or an email message. Then, emergency operations center staff may record the reported damages. A damage assessment may be performed by a trained professional, the trained professional may create and send a report of the assessment. Damage assessment officers may go through all of the affected areas and send status updates. An assessment of the damage may be recorded electronically. The emergency response center may receive updates and prioritized plans of restoration of services. Technical crew may be deployed to restore affected sites. A repair job may be accomplished, and a final completion report is recorded. A response manager may provide technical support on the phone to monitor the progress. Finally, the emergency operation center may receive updates and have the ability to manage progress across a network while updates and communication to stakeholders may be managed centrally. At each phase of this process, an estimated time of restoration (ETR) is unknown and an estimated time of arrival (ETA) of technicians is unknown.

Current issues with outage predictions include predictions that are made before the natural disaster or weather event that are not comprehensive and don't allow for accurate or optimal integration of the data being made available, for example the data obtained at each phase of the weather event. Outage predictions currently do not incorporate self-learning, model feedback and cognitive analyses to optimize predictions with continual refinement of a model. Therefore, it may be advantageous to, among other things, create an accurate and pertinent self-learning-based outage predictions and notifications to customers without access to services and to dispatch optimal crews, technicians or other services to the affected regions for restoration.

The following described exemplary embodiments provide a system, a method and a program product for restoration time predictions and optimized recovery solutions. As such, embodiments of the present invention have the capacity to improve the field of outage restoration time prediction and optimized recovery solutions by leveraging machine learning to accurately predict restoration times and meta-heuristics to optimize the outage recovery solutions. More specifically, deep learning will be used to create a self-learning model to predict accurate outage restoration information. The self-learning model predictions and meta-heuristics will be used to provide an optimized pathway for dispatch crew and technicians.

The use case presented herein may refer to a storm and the outages that a storm may cause in a region affected by the storm. Other use cases may refer also to natural disasters, such as hurricanes, earthquakes, tornadoes, or any form of regional emergency situation that could cause major disruption to the residents of that region affected by the natural disaster or weather emergency. Outages may refer to, for example, utility outages, road obstructions or floods, power outages, water outages, residential homes outages or commercial buildings outages.

According to an embodiment, various types of machine learning (ML) models may be trained, built and used to create predictive results for determining accurate outage data, restoration times and recovery solutions when a natural disaster, weather event or large-scale emergency happens. Data or information from different industries that provide services and microservices may be obtained from many different sources and domains. Different sources and domains may be related to, for example, utility services, emergency services, hospital services, weather services, news services, non-profit rescue services, social media, regional services, local services, state services, government services, equipment services, food supply services and academic services.

Historical data and current or real-time data may be referred to as collected data or received data and may be used for the model building, training, learning and fine-tuning or feedback phases. The collected data may be used for analysis and added to a corpus or a database that stores the training data, the real-time data, the predictive results, the user feedback and the model performance. The collected data may, for example, be received from various devices through a communication network, such as an internet of things (IoT) device, a global positioning system (GPS) device, a sensor, a smart watch, a smart phone, a smart tablet, a personal computer or an automotive device.

Machine learning (ML) models may also include deep learning models and artificial intelligence (AI) models. Training and updating a machine learning (ML) model may include supervised, unsupervised and semi-supervised machine learning (ML) procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

Supervised learning and semi-supervised learning may incorporate feedback or ground truth by having an individual check the accuracy of the data, data labels and data classifications. Individuals may be a user or a subject matter expert (SME) who has extensive knowledge in the particular domain of the dataset. The subject matter expert (SME) input may represent ground truth for the machine learning (ML) model and the provided ground truth may raise the accuracy and the predictive capabilities of the model. The user or the subject matter expert (SME) may correct, amend, update or remove the classification of the data or data labels by manually updating the labeled dataset. Incorporating feedback to the model from users or subject matter experts (SMEs) improve the accuracy of the model as datasets are updated or corrected.

The supervised or semi-supervised machine learning (ML) may be used to allow an individual (e.g., a user, an expert or an administrator) to have some improving effect over the training of a model by having the ability to validate, alter, update or change the training set. Individuals may provide input or feedback into a model by altering the training set or the feedback loop as opposed to an unsupervised machine learning (ML) environment, when a user may not provide input to the data. The training set of data may include parameters of a classifier or a label for learning purposes and a supervised or semi-supervised machine learning (ML) environment may allow the user to update the labels or classifiers of the training set.

Cognitive analyses, such as natural language processing (NLP) and semantic analysis, may be used during the building and training of a model. The cognitive analytics may analyze both structured and unstructured data to be incorporated into the machine learning (ML) process. Natural language processing (NLP) may be used to analyze the quality of data or feedback that is received for training and model building. Structured data may include data that is highly organized, such as a spreadsheet, a relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

The received data may be processed using natural language processing (NLP) to extract meaningful information for training and building a model. Semantic analysis may be used to infer the complexity, meaning and intent of the information or data received to identify outages of services in a microservice network. Semantic analysis may also consider syntactic structures of information at various levels to infer meaning to words, phrases, sentences and paragraphs of the received, collected or extracted data.

According to an embodiment, deep learning models are trained using data or data points from multiple diverse sources, such as from an outage management system, a work management system, live weather data, rainfall data before a storm, a population density from a particular region or geographical location, map sources or historical data. An outage management system may provide the type of outage and outage reports. A work management system may, for example, provide data for work crew, field technicians and equipment availability.

According to an embodiment, the trained deep learning models are used or leveraged to predict outages from a natural disaster, extreme weather conditions or emergencies. Models may also be built, trained and used to provide a shortest navigation path based on a function per outage node by selecting a global minimum from multiple meta heuristic techniques, including a genetic algorithm and an annealing stochastic process. A shortest navigation path may include for example, finding a path for an outage engineer to work on one or more critical outages while minimizing the outage factor. An outage node may be identified by, for example, a population impacted by the outage, the criticality of the outage or the average expectation time to respond to an outage. A global minimum may refer to, for example, minimizing the outage function to ensure a larger and key population segment can restore power immediately. Multiple meta heuristic techniques may refer to, for example, finding a local minimum of an objective function.

Genetic algorithms may be used to understand and identify various permutations to minimize the outage restoration function. An annealing stochastic process may, for example, refer to another model that may find a local minimum. The model may be self-learning and self-improving and may provide accurate predictions using real-time data during different phases of an outage. The self-learning or feedback loop may enable learning and improvements in the accuracy of predictions over time.

The deep learning model may analyze parameters and data collected from pre-storm conditions, during storm conditions and post-storm conditions to model the data using a tree-based technique to handle both linear and non-linear models, including bagging and tree pruning. Bagging and tree pruning may include removing correlations among data to improve an overall accuracy. An accelerated failure time (AFT) model may provide data curves while predicting the estimated restoration time (ERT) using a classification and regression tree (CART) for an affected region or potentially affected region. The predicted estimated restoration time (ERT) provides an input into a fitness function that will assist in an outage restoration pathway for dispatch crews based on genetic algorithms and annealing techniques. The fitness function may be customized, for example, by a utility company to create a score that prioritizes outages to resolve critical and key outages in the shortest possible time based on an estimated time to restore the outage and the amount of time needed to reach the outage point (i.e., node).

According to an embodiment, deep learning models may also be trained to identify and select the best model to use outage predictions based on the data points, the number of predictors, the number of leaf nodes, the mean square error or the tree size. Data points may include, for example, past storm history data, wind gust speed, rain amount, images or video footage from a utility company or a social media post. The number of predictors may be arranged to predict the amount of time to restore an outage or an estimated restoration time (ERT). The mean square error for a tree size may create leaf nodes. The leaf nodes may be selected in such a way that reduces the mean square error. For example, if not enough information is received or obtained, a standard estimated restoration time (ERT) time may be provided to customers.

According to an embodiment, many models may be created, for example, a model for each outage phase, such as a pre-storm phase model, a model for reports and data received during a storm and an outage restoration phase model. Examples of data used for a pre-storm model may include a wind gust speed, rainfall before the storm, the duration of a storm and the population density. Examples of data obtained and used during a storm may include outage data from smart meters, outage data from a public web site or social media posts and outage data from news articles. Examples of data obtained during the outage restoration phase may include damage assessments, crane or equipment availability, crew or technician availability, current rainfall data, predicted rainfall data and tree damage data.

According to an embodiment, deep learning may be utilized to leverage data beyond weather event detection. For example, once an outage is detected, additional data related to weather conditions and resource availability data may be used to predict accurate and optimal solutions to outages. For example, live availability to repair tools, such as cranes, and maintenance crew availability is used to restore the predicted and detected outages. Damage assessments made by utility employees may be used for obtaining an accurate estimated restoration time (ERT) estimates. The predictions may be refined using previous deep learning analyses and results, a feedback loop or self-learning techniques.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and an outage restoration prediction program 110a. The networked computer environment 100 may also include a server 112 that is enabled to run an outage restoration prediction program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the outage restoration prediction program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the outage restoration prediction program 110a, 110b (respectively) to accurately predict when restorations will occur after a weather event and to provide optimal solutions for the recovery efforts. The outage restoration prediction method is explained in more detail below with respect to FIGS. 2 and 3.

Figure 2:
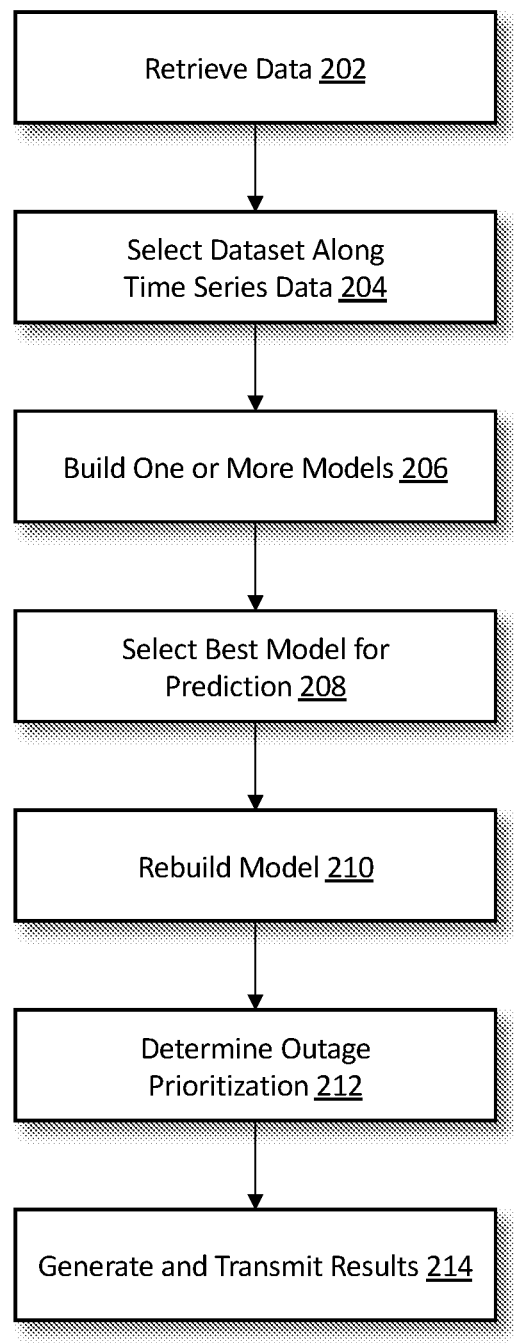
FIG. 2 is an operational flowchart illustrating a process for a deep learning-based outage restoration prediction and recovery optimization solution according to at least one embodiment.

Referring now to FIG. 2, an operational flowchart illustrating the exemplary outage restoration prediction and recovery optimization solution process 200 used by the outage restoration prediction program 110a, 110b according to at least one embodiment is depicted.

At 202, data is retrieved. The data may be retrieved or collected from multiple domains that collect data and may be related to a natural emergency. Some domain specific databases may receive, and store data related to utility services, emergency services, weather services, news stations, social media posts, local or state services, government services and equipment services. The data stored may include historical data and real-time data being sent to a database for storage from multiple different devices. The data that is collected may include, for example, weather data such as wind gusts, precipitation, radar information, temperatures or humidity or data related to traffic conditions, outages, social media posts, news outlets, medical facility capacities, emergency transport services or machine availability data. The multiple devices that may collect, receive, transmit or store some of the collected data may include, for example, an internet of things (IoT) device, a global positioning system (GPS), a sensor, a smart watch, a smart phone, a smart tablet, a personal computer, an automotive device or a sensor. The collected data may be used to build a machine learning model that will accurately predict an outage recovery processes and a recovery timing from a natural emergency, such as a storm.

At 204, a dataset is selected along time series data. The dataset selected may be selected based on the collected data. The time series data may include, for example, the amount of rain or a current wind speed to analyze the status of the storm and how the storm is moving with time. The dataset that is selected along time series data may include variables or covariates used for an output restoration time. The output restoration time may refer to, for example, one or more storm types or natural disasters such as, a hurricane, a winter storm, a tropical storm, an ice storm, an earthquake or a wildfire.

Using a storm as the use case and a running example, R is a finite vector with actual restoration time obtained from past restoration data in a given geographical location given the past conditions. A predicted output restoration time is a function of a set of measurement vectors. The measurement vectors include (N, E, $\phi$, P, D, X1, X2, A). N may refer to gust speed. E may refer to the amount of rain. The symbol $\phi$ may refer to a categorical variable that shows the status of an outage, a service outage, a tap outage or a feeder outage, all of which may be inputs from an outage management system. P may refer to the value that represents the availability of recovery crews or technicians and equipment. P may be a nominal value with an output of, for example, yes or no. D may refer to a finite vector with a duration of storm, storm receding time and storm starting time. X1 may represent the rainfall prior to a storm. X2 may represent the rainfall after a storm. A may represent an outage assessment.

R may be a predictor variable or a predictor response variable that shows past estimated restoration time (ERT) of a device category given a previous storm that occurred at the $m^{th}$ location.

An outage assessment, A, at a given time may be represented by $$A(\ )=[M/L/H] \text{ at the location } [i]$$

where A may collect or receive inputs from an initial outage assessment to an enroute assessment that will take three categorical values of a low (L), medium (M) and high (H). Initially, the value of A will be zero or empty. The initial outage assessment may be unique to each location of the storm.

The categorical variable, $\phi$ may, for example, may be represented as $$\phi=\{\phi_1, \phi_2, \phi_3\}$$

where $\{\phi_1, \phi_2, \phi_3\}$ represents three kinds of outages, such as a service outage, a tap outage and a feeder outage. The storm category, represented by m, for a given region, subregion or county may be represented in Table 1.

TABLE 1

Storm Category Identification Table

| Location | Wind Speed | Density of Population | Category of Storm |
|---|---|---|---|
| L1 | $w_1$ | $p_1$ | $m_1$ |
| L1 | $w_1$ | $p_2$ | $m_2$ |
| L2 | $w_1$ | $p_1$ | $m_1$ |
| L1 | $w_1$ | $p_1$ | $m_3$ |

The vector of E values may be chosen from each device d and each value n. E may be the life of an asset. For example, E may be the lifetime of the asset, such as a transformer, provided by a company that is at the end of life, may have a higher probability of failing and may have a higher estimated restoration time (ERT) than a new device or transformer that is installed at location l[i]. Using the categorical variable, $\phi$, from each device d and each value n, the following expression, $$\phi=\{\phi_1, \phi_2, \phi_3, \ldots, \phi_n\}$$

represents, for example, a company specified lifetime for each piece of equipment selected for restoring an outage area after selecting a device, customer output and E vector. The vector quantities may be converted to data from a selected device. For example, an environmental analyzer, while leveraging the dataset from Table 1, may be used to create a data frame for the $i^{th}$ outage in a particular geographical region.

An environmental analyzer may be represented by measurement vectors. Each measurement vector may be a feature and a data frame may be created or a matrix may be created by using the measurement vectors to predict an outage restoration time. For example, environmental analyzer measurement vectors may be represented in Table 2.

TABLE 2

| Storm Category | Location | Storm Duration | Type of Outage | Crew Availability |
|---|---|---|---|---|
| $m_1$ | $l_1$ | d | $\phi$ | Y/N |
| Stock Availability | Waiting Time | Waiting Time | Actual Restoration Time | |
| Y/N | $t_1$ | $t_2$ | $m_1$ | |

The storm category may include the category of the storm, such as a winter storm, a tropical storm or a hurricane. The locations are different locations of the storm. The storm duration may vary depending on the kind of storm, for example, a winter snowstorm may last longer than a summer storm. The type of outage may be obtained from, for example, an acquisition system and may include a type of outage, such as a feeder outage or a service outage. The crew availability may be considered at the point of data reaching a control room or dispatch center. The stock availability may include, for example, a bill of materials that may be required to repair the outage. The waiting time, $t_1$, may be the wait time for the crew to arrive if they were not available during the outage. The waiting time, $t_2$, may be the wait time for equipment, such as a crane, tractors or other necessary equipment to arrive if data is not available or if the necessary equipment does not arrive on time. The actual restoration time may include an actual time that the restoration is resolved, when the restoration has been resolved.

Additional details may include the population density of the storm which may be represented by a variable, s, and s may be a location specific population density. The gust speed may be represented by the speed or velocity of the wind. The storm wind speed for a given density population may be categorized as H, M, L , high, medium or low, respectively, based on wind speed. The rainfall prior to the storm may be represented as the measurement vector X2. The unit of the measurement vector X2 is in millimeters (mm). Each root node may represent a single input variable, x, and a split point on that variable if the variable is numeric. The leaf nodes of the tree may contain an output variable, y, and y may be used to make a prediction.

At 206, one or more models are built. One model may include a classification and regression tree (CART) model. Another model that may be built is a cross validated decision tree model that includes a tree pruning technique. One other model that may be built includes a bootstrap aggregating model, also known as a bagging model, that will also use a tree aggregation process to reduce variance. The models may be based on unsupervised learning. The models leverage tree model approaches due to the tree models allowing for variables that are non-linear to be analyzed. Tree models may also allow different distributions to be analyzed, such as Gaussian or triangular distributions.

The classification and regression tree (CART) model may create predictive outcomes based on values, such as predicting the outage recovery time based on the multiple variables introduced in step 204. The classification and regression tree (CART) model may provide an output that is a decision tree and each section or fork may be a predictor based on that particular variable, thus, creating an outcome variable at the end of the node. For example, the classification and regression tree (CART) model has tree-like decision or output data structures that can easily be interpreted by outage engineers. The leaf node is a response variable (i.e., a predicted expected restoration time (ERT)) and a root node may represent various measurement vectors X that may be used to make a prediction. The classification and regression tree (CART) modeling is based on a greedy splitting to divide the binary space. The cost function (i.e., the difference between the actual value and the predicted value) for a given region may be calculated and the variable that provides the lowest split is selected as a root node. This process is recursively worked backward until a decision tree is formed.

For the classification and regression tree (CART) model, a null hypothesis or a linear regression mode may be used to provide an output or an explanation of the variation of dependent variables. The model may be created, and a p value may be generated. The p value may provide a confidence value of the model as compared to a null value model.

The classification and regression tree (CART) model may be built or run by choosing a threshold value for each of the measurement vectors (e.g., X1 and X2) and by calculating the sum of squared error (SSE). The sum of squared error (SSE) may be calculated by taking the difference between the actual restoration time and the estimated restoration time (ERT). The threshold value may be chosen based on the different vectors. For example, a threshold value of each of the different vectors is chosen and the sum of squared error (SSE) is calculated for each threshold value for each vector. Then, calculations may be made recursively to find the set of threshold values among the different measurement vectors. For example, working recursively, the set of threshold values among the different measurement vectors in X, such as N, D, A, that are calculated as the lowest error.

The cross validated decision tree model including a tree pruning technique allows for the training dataset and the testing datasets to be alternated between for analysis. For example, for a space in region R for a given geographical map, the following calculation is made $$RSS = \min \Sigma_i (y - e(x))^2$$

where y and e(x) (e.g., $y_i$ and $e(x)/(y_{R_j})$) represent the expected or the predicted restoration time for a given region R. The calculation provides a value for a given data point. Then, minimizing an error or a leaf and xij as a point in a region R, the following representation is provided $$\sum_{x_i \in R_1(J_1,s)} y - e(x))^2 + \sum_{x_i \in R_2(J,s)} y - e(x))^2$$

where xij is a point in a region s. An additional calculation may be made to improve the accuracy and may be represented as shown $$\sum_{j=1}^{J} \sum_{i \in R}^{n} (y_i - y_{\widehat{R_{ij}}})^2$$

where the representation is for i points in $R_j$ region. refers the region in the tree data structure.

To perform recursive binary splitting $X_j$, s is chosen, where j represents the predictor in a set of measurement vectors X and s represents the threshold value of $X_j$. The process may be run through different measurement vectors in X, such as {N, P, X1, X2, φ} and all possible values of s to obtain the lowest sum of square error (SSE) value. The lowest sum of square error (SSE) forms the first split in the tree. Then this is recursively done at various times until a desired threshold is met.

For complicated trees, correlations may be removed and an additional function, alpha α, may be used to penalize the tree (i.e., improve the model accuracy). The function α may be a penalization factor to remove features or measurement vectors that are correlated. The alpha function may improve the model accuracy if feature vectors or if independent measurement vectors link N, M, etc., are correlated. A total error loss representation using the alpha function may be notated as follows $$\text{Total Error Loss} = \alpha T + \sum_{Rj} \sum_{1}^{J} (y_i - \hat{y_{ij}}^2)$$

where T represents the number of terminal nodes of the tree, $R_j$ is the rectangular region in the decision tree and i and j represent the number of datapoints in that region, $R_j$. The total error loss may need to be minimized to find regions of the tree, $R_1, R_2, R_3 \ldots R_j$, such that the total loss between an actual expected restoration time (ERT) and a predicted expected restoration time (ERT) are minimized.

The cross validated decision tree model may reduce variances and assist in building and training the model over different groups or different sets. The cross validated decision tree model may be used for the purpose of building a tree or a decision tree with a higher level of accuracy and by running the model on one or more test sets.

The bagging model may be used for meta-algorithms, may use statistical classification and regression analysis and may improve the accuracy of the predictions. For example, an improvement in the accuracy of the predictions may be accomplished using the following representation $$\hat{f(x)}_b = 1/B \sum_{1}^{B} (\hat{f^b(x)})$$

where B represents bootstrapped samples and $\hat{f(x)}_b$ represents a predicted expected restoration time (ERT) for the bootstrapped sample. A bootstrap may be created as bootstrap training samples and the samples may be run by the model multiple times to obtain different training samples. The multiple or continuous running of the model to produce multiple training samples may be averaged to reduce a statistical variance.

At 208, a best model is selected for predictions. The best model (i.e., the selected model) may be selected for a prediction based on a minimization of the mean square error (MSE) or using cross validation. The selected best model may be run multiple times using the same test data using decision trees to reduce the variance of the model. The best model may be selected among each model, the classification and regression tree (CART) model, the cross validated decision tree model and the bagging model. For example, using a training set or a training dataset X, the classification and regression tree (CART) model may be run using training set X, the cross validated decision tree model may run using training set X and the bagging model may run one or more times using training set X. The models may be run to reduce the variances and the best model is selected.

For a given training dataset, if the number of predictors is less than 7, then the minima computation may be represented as $$\left\{ \begin{array}{c} \text{compute mimima} \, \hat{f1(x)} \hat{f2(x)} \hat{f3(x)} \hat{f4(x)} \ldots \text{for predictors} < 10] \\ \text{compute minima for two models} \end{array} \right\}$$

where the compute minima for the two models may represent computing the minima for the cross validated decision tree model using tree pruning and for the bagging model.

At 210, the one or more models are rebuilt. A model may be rebuilt by repeating steps 204, 206 and 208 using additional data attributes, such as data gathered as damage begins or when the storm recedes. Models may be rebuilt, or new models may be built when new data attributes become available. For example, a new model is built, or a currently built model is updated based on new data, such as updated rainfall data, updated ice accumulations, spatial data, maps and regional locations affected during the storm. New or updated models may be built based on different phases of the storm, such as pre-storm attributes, during-storm attributes and post-storm attributes. Table 3 represents an example of pre-storm attributes.

TABLE 3

Pre-Storm Attributes

| Data Attributes | Trigger Events | Incoming State Transitions | Outgoing State Transitions | Transition Calculations |
|---|---|---|---|---|
| Type of Outage Identified as Service Outage, Tap Outage or Feeder Outage | Outage Reported through Customer Channel or Smart Meter | Type of Outage Reported from Outage Management Server (OMS) | t mean Does it belong to $1^{st}$ Leaf Node $L_1$ If yes, give mean restoration time or else show standard ERT If not, move to next parameter | Best model based on step 208 |
| Duration of Outage | Storm Duration Data from Weather Database for Region | Outage | Does it belong to Node 1 or Node 2? If not, show standard ERT If yes, show mean $t_{mean}$ for a given region | Best model based on step 208 |
| Crew Availability using C as the nominal variable | Availability of Crew at the time dispatch team requires the availability | $O_I$ Φ C Or ΦUOi Or ΦUOiU C | If it is a part of Node 1, then do A If it is part of Node 2, then do B If it is a part of Node 3, find output of C and map to share the $t_{mean}$ | Best model based on step 208 |
| Stock Availability D- Nominal Variable | Availability of Stock at the time Dispatch Team is in need for it | $O_I$ Φ C Or ΦUOi | Is it a part of Node 1- Then do as A Is it a part of Node 2 then do as B Is it a part of Node 3- | Best model based on step 208 |

TABLE 3-continued

Pre-Storm Attributes

| Data Attributes | Trigger Events | Incoming State Transitions | Outgoing State Transitions | Transition Calculations |
|---|---|---|---|---|
| | | Or $t_1$ ΦUOiU CU $t_1$ Or in combination | Find output of C and map to share the $t_{mean}$ Is it a part of Node 4- if Yes share $t_{mean}$ | |
| Crew Waiting Time | Waiting time for Crew | $O_I$ Φ C Or ΦUOi Or ΦUOiU CUt$_1$ | Is it a part of Node 1- Then do as A Is it a part of Node 2 then do as B Is it a part of Node 3- Find output of C and map to share the $t_{mean}$ Is it a part of Node 4- if Yes share $t_{mean}$ Is it a part of Node 5 if Yes share t $t_{mean}$ | Best model based on step 208 |
| Crew Waiting Time $t_1$ | Waiting time for Crew | $O_I$ Φ C Or ΦUOi Or ΦUOiU CUt$_1$ | Is it a part of Node 1- Then do as A Is it a part of Node 2 then do as B Is it a part of Node 3- Find output of C and map to share the $t_{mean}$ Is it a part of Node 4- if Yes share $t_{mean}$ | Best model based on step 208 |
| Stock Waiting Time ($t_2$) | Waiting time for Crew | $O_I$ Φ C Or ΦUOi Or $t_1$ or ΦUOiU CUt$_1$ Or in either combination | Is it a part of Node 1- Then do as A Is it a part of Node 2 then do as B Is it a part of Node 3- Find output of C and map to share the $t_{mean}$ Is it a part of Node 4- if Yes share $t_{mean}$ | Best model based on step 208 |

Table 4 represents an example of post-storm attributes.

TABLE 4

Post-Storm Attributes

| Data Attributes | Trigger Events | Incoming State Transitions | Outgoing State Transitions | Transition Calculations |
|---|---|---|---|---|
| Amount of Rainfall | Weather applications and map applications or application program interfaces (APIs) | Map applications or application program interfaces (APIs) | Is it a part of Node 1- Then do as A Is it a part of Node 2 then do as B Is it a part of Node 3- Find output of C and map to share the $t_{mean}$ Is it a part of Node 4- if Yes share $t_{mean}$ | Best model based on step 208 |
| Amount of Rainfall | Weather applications and map applications or application program interfaces (APIs) | Map applications or application program interfaces (APIs) | Is it a part of Node 1- Then do as A Is it a part of Node 2 then do as B Is it a part of Node 3- Find output of C and map to share the $t_{mean}$ Is it a part of Node 4- if Yes share $t_{mean}$ | Best model based on step 208 |
| Water-Logging near the area of Outage | Yes or No | Onsite Assessment | Is it a part of Node 1- Then do as A Is it a part of Node 2 then do as B | Best model based on step 208 |

TABLE 4-continued

Post-Storm Attributes

| Data Attributes | Trigger Events | Incoming State Transitions | Outgoing State Transitions | Transition Calculations |
|---|---|---|---|---|
| Tree Damage near the Site of Outage | Yes or No | Onsite Assessment | Is it a part of Node 3- Find output of C and map to share the $t_{mean}$ Is it a part of Node 4- if Yes share $t_{mean}$ Is it a part of Node 1- Then do as A Is it a part of Node 2 then do as B Is it a part of Node 3- Find output of C and map to share the $t_{mean}$ Is it a part of Node 4- if Yes share $t_{mean}$ | Best model based on step 208 |

At 212, an outage prioritization is determined. An outage prioritization for each outage node is determined. The outage prioritization may be determined using, for example, genetic algorithms and annealing. Outage prioritization may include prioritizing outage information or for prioritizing the best navigation pathway based on a fitness score or fitness function. The fitness function may include the expected restoration time (ERT) computed in previous steps. The outage information prioritization may include the number of customers impacted by the outage. The navigation pathway information prioritization may include the travel time to destinations of outages in specific regions or locations based on geographical data.

For example, the number of customers impacted by the storm may be obtained based on a given region and the outage points may be identified where the crew and the equipment are available for one group of technicians. For a given space or region R, all nodes may be identified. The nodes identified for the region R may include the sum of rolled up outages, the customers impacted and the approximate time to restore. Outages may need to be rolled up. For example, many outage node points may have the same root outages and root outages may have many child node outages. If the root outage is resolved, then all the child node outages also get resolved. A fitness score may be created by the following function $$f(node1) = f(x, y): -x*y + t$$

for each node where x represents the number of outages, y represents the number of customers impacted and t may be the time difference between the predicted expected restoration time (ERT) and the time it may take to reach the outage point. The negative sign (−x) may be used to find the minima and the node with the highest number of outage customers that have the least fitness function score. The node with the highest number of outage customers and the least fitness function score may be prioritized. For example, the least fitness function score may be prioritized since the function score is a negative function, negative function=−x*y, thus the maxima becomes the minima and the fitness value is chosen with the minimum value.

The fitness function may be calculated for each node, outage point, tap or feeder by creating a fitness matrix. Consider the fitness or cost matrix for each item as appended as follows

| $f_{11}$ | $f_{12}$ | $f_{13}$ |
|---|---|---|
| $f_{21}$ | $f_{22}$ | $f_{23}$ |
| $f_{31}$ | $f_{32}$ | $f_{33}$ | where each function in the matrix represents a value function, such as a cost, objective or a fitness value of a given path. The subscript number of the functions represent a pathway such that i represents the iteration of the pathway and j represents the pathway number. Each end to end path in the genetic algorithm may become a parent node. A parent node may be selected at random and a pathway may be identified to a child node that has a less objective value that is less than two parents. If the pathway mutates based on the genetic algorithm, then a new mutated pathway may become the parent node. The genetic algorithm or the annealing technique may, for example, be run daily to prioritize or re-prioritize an outage scheduling route for an engineer to restore the outage.

A genetic algorithm example representation may include data referred to in Table 5.

| | $Node_0$ | $Node_1$ | $Node_2$ | $Node_3$ | $Node_4$ | $Node_5$ | $Node_6$ | Total Time Taken Across Pathway |
|---|---|---|---|---|---|---|---|---|
| Pathway 1 | 1 | 2 | 3 | 4 | 5 | 6 | 7 | $f_{11}$ (Parent 1) |
| Pathway 2 | 2 | 5 | 4 | 6 | 3 | 1 | 7 | $f_{12}$ (Parent 2) |
| Pathway 3 | 3 | 4 | 5 | 6 | 2 | 1 | 7 | $f_{13}$ |
| Pathway 4 | 3 | 1 | 2 | 6 | 4 | 5 | 7 | $f_{14}$ | where pathways 1-4 represent alternative routes for traveling to a node. Nodes 0-6 represent outage locations and the total time taken across the pathway represents a fitness score as defined by a function. A pathway, $f_{1i}$ may represent a fitness score based on the fitness score function (i.e., $f(node1)=f(x, y): -x*y+t$) arising from an original path. For example, assume two parent pathways may be taken at random, pathway 3 and pathway 4, whose parent 1 is pathway 1, 1-2-3-4-5-6-7 and parent 2 is pathway 2,-5-4-6-3-1-7, respectively.

A child outage pathway may be generated from each link, for example, link 1-2. The route that has a fitness score that is lower than the parent value may become the new parent node. For example, child outage pathway 1 is 1-2-5-4-6-7 and child outage pathway 2 is 1-2-3-4-6-5-7. A child outage pathway may be generated using Table 6 below. Table 6 may represent a model construct for generating a child outage pathway. Table 6 creates an offspring methodology for two parents, parent 1 and parent 2 with parent 1 being 1-2-3-4-5-6-7 and parent 2 being 1-2-4-6-5-7-3. The child outage pathway or the modified pathway may be generated by finding the common links.

TABLE 6

Child Outage Pathways

| Options | Random Selection | Tour | |
|---|---|---|---|
| 1 | 1-2, 1-7 | 1-2 | 1-2 |
| 2 | 2-3, 2-5 | 2-3 | 1-2-3 |
| 3 | 3-4, 3-6 | 3-6 | 1-2-3-4 |
| 4 | 4-5, 4-6 | 4-6 | 1-2-3-4-6 |
| 5 | 5-6, , 5-4 | 5-4 | 1-2-3-4-6-5 |
| 6 | 6-7, 5-7* | 5-7 | 1-2-3-4-6-5-7 | Sub tour reversal | where option represents the links between two outage points, random selection represents selecting a random link, tour represents a distance traversed. Offspring 1 at 1-2-3-4-6-5-7 may be option 1 and offspring 2 at 1-2-5-4-6-7 may be option 2 shown in Table 7 below.

Table 7 may represent an alternate embodiment representation of a different model than Table 6.

TABLE 7

Child Outage Pathways with Binary Coding

| Link/Binary Coding | Options | Random Selection | Tour | |
|---|---|---|---|---|
| 1(0001) | 1-2, 1-7 | 1-2 | 1-2 | |
| 2(0010) | 2-3, 2-5 | 2-3 | 1-2-5 | |
| 3(0011) | 3-4, 3-6 | 3-6 | N/A | |
| 4(0100) | 4-5, 4-6 | 4-6 | 1-2-5-4 | |
| 5(0101) | 5-6, , 5-4 | 5-6 | 1-2-5-4-6 | |
| 6(0110) | 6-7, 5-7* | 6-7 | 1-2-5-4-6-7 | Sub tour reversal |

For example, using the genetic algorithm to identify the destination nodes where the crew should go based on the fitness function, the following representation may be considered M=100000;
costMatrix=as.matrix(rbind(
c(0, 12, 10, M, M, M, 12),
c(12, 0, 8, 12, M, M, M),
c(10, 8, 0, 11, 3, M, 9),
c(M, 12, 11, 0, 11, 10, M),
c(M, M, 3, 11, 0, 6, 7),
c(M, M, M, 10, 6, 0, 9),
c(12, M, 9, M, 7, 9, 0)));
numcities=7;
then given a tour, the total cost is represented as

```
tourCost <- function(tour, costMatrix) {
    tour <- c(tour, tour[1])
    route <- embed(tour, 2)[, 2:1]
    sum(costMatrix[route])
}
``` and taking the inverse of the total distance is the fitness and that is represented as

```
tspFitness <- function(tour, ...) 1/tourCost(tour, ...)
result <- ga(type = "permutation", fitness = tspFitness,
costMatrix=costMatrix, min = 1,
    max = numcities, popSize = 10, maxiter = 500, run = 100,
pmutation = 0.2
    , monitor = NULL)
``` instead.
and using the first solution

```
soln <- as.vector(result@solution[1,]) # use first soln
tourCost(soln, costMatrix)
``` for the approximate best tour

```
tour <- c(soln,result@solution[1]).
```

Using the data from Tables 6-7 above that depict two different models that select a child outage pathway, the time taken to each of the routes may be extracted and the time taken for a particular route may be calculated. The offspring nodes may now become parent nodes and new offspring nodes may be created.

An annealing technique may be used to identify the minima based on the fitness function. The annealing technique may be similar to a genetic algorithm in that both the annealing technique and the genetic algorithm may, for example, prioritize outage points for the day so that outages may be restored quickly. For outage prioritization at each step of the running of a model, a simulated annealing heuristic may consider some neighboring outage points that may have a fitness value less than the initial step. A decision may be made between moving from an outage point node to the point of the steepest gradient. The probabilities that result from the annealing technique may lead the points that have a lower objective function. The annealing technique is a meta-heuristic technique similar to the genetic algorithm that finds the optimum value for a given function. The annealing technique may be used to find the shortest path in order to maximize the fitness function or the objective function. For example, the annealing technique may be repeated until the system reaches a state that is optimal for the application or until a given computation budget has been exhausted.

The minima value of the annealing stochastic or the genetic algorithm may be used to prioritize the outages and to evaluate and identify the best or most optimal pathway, for example the optimal pathway for the crew. For an outage restoration, a new outage point may come up and the annealing or the meta heuristic technique may be revalued to navigate to a new point.

At 214, the results are generated and transmitted. Accurate expected restoration time (ERT) predictions and results are generated and may be transmitted to customers. An optimization and navigation of the outages may also be generated and transmitted based on an outage prioritization. The results may be transmitted via a computing device connected to a communication network, such as a personal computer, a smart phone, a smart watch, a tablet. The results may be transmitted using multiple applications, such as an outage management system or a workforce dispatch management system.

Figure 3:
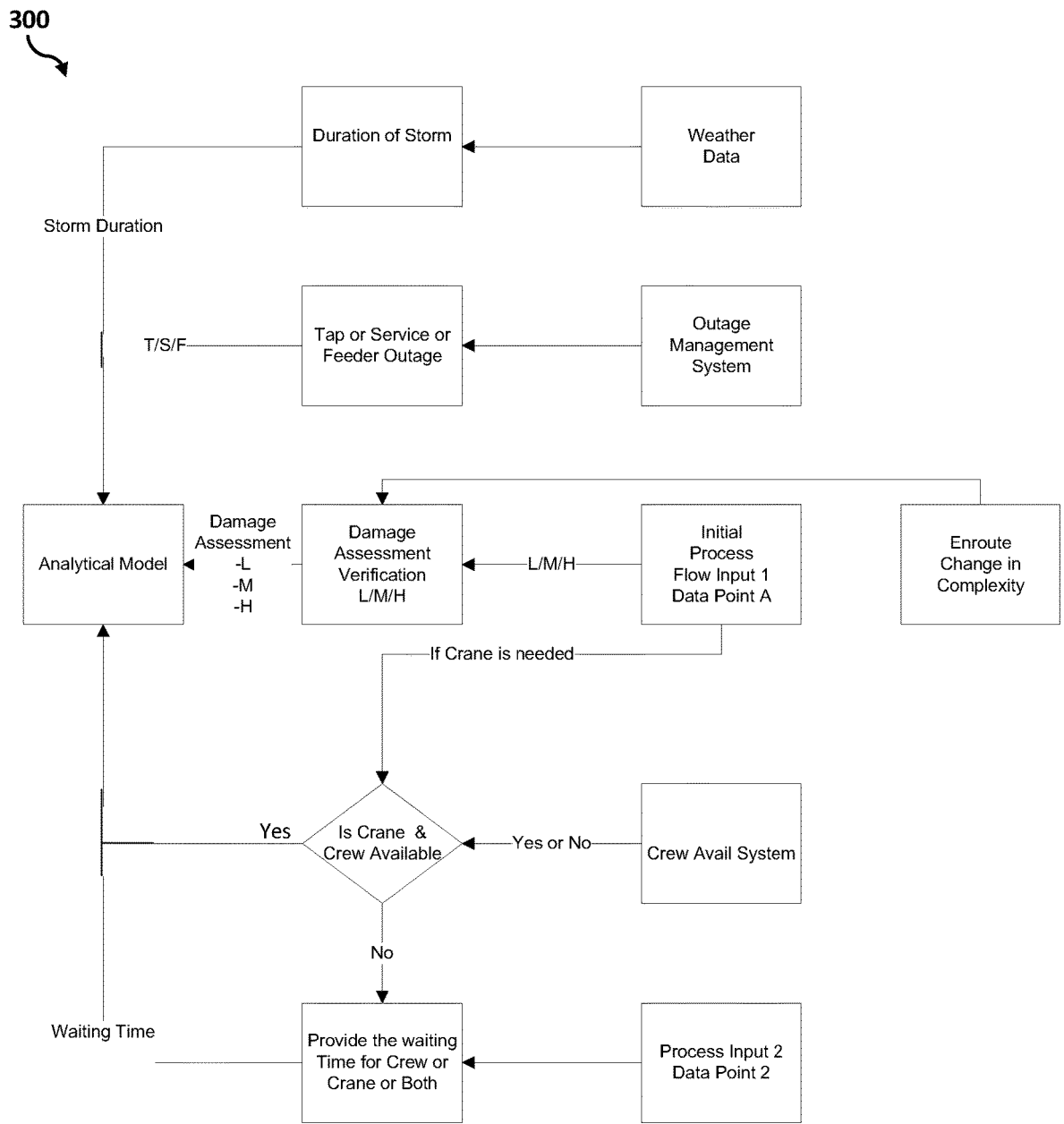
FIG. 3 is a block diagram example of outage restoration predictions and recovery solutions for a weather event according to at least one embodiment.

Referring now to FIG. 3, a block diagram example of outage restoration predictions and recovery solutions for a weather event 300 used by the outage restoration prediction program 110a, 110b according to at least one embodiment is depicted. The sample diagram provides a representation of data flow, a representation of analytics and a high-level overview of data processing as they relate to recovery solutions during a weather event. The concepts have been described previously in detail and the flow sample presented is to only serve as one example of providing a visual representation of the data flow and analysis.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
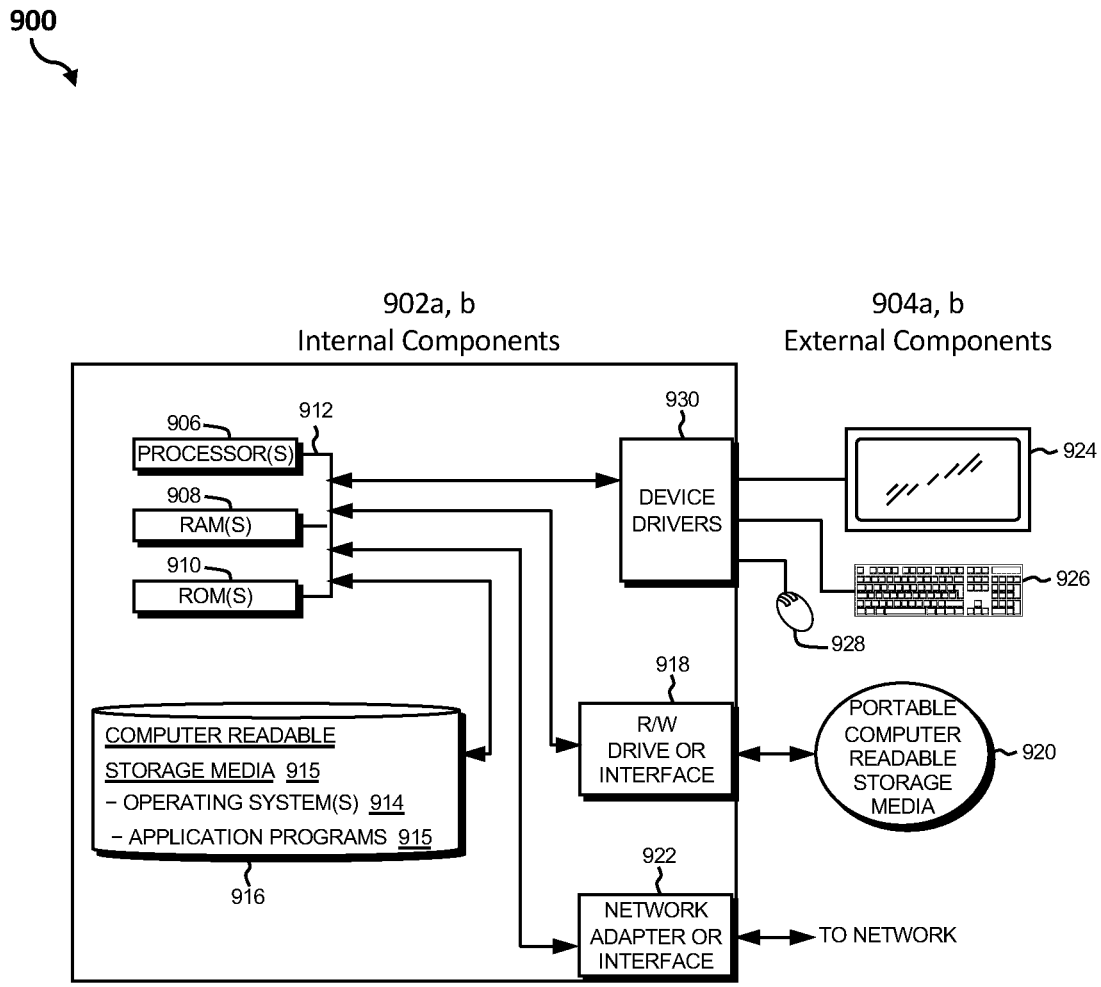
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the outage restoration prediction program 110a in client computer 102, and the outage restoration prediction program 110b in network server 112, may be stored on one or more computer readable storage media 915 for execution by one or more processors 906 via one or more RAMs 908 (which typically include cache memory). In the embodiment illustrated in FIG. 4, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the outage restoration prediction program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the outage restoration prediction program 110a in the computer 102 and the outage restoration prediction program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the outage restoration prediction program 110a in computer 102 and the outage restoration prediction program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
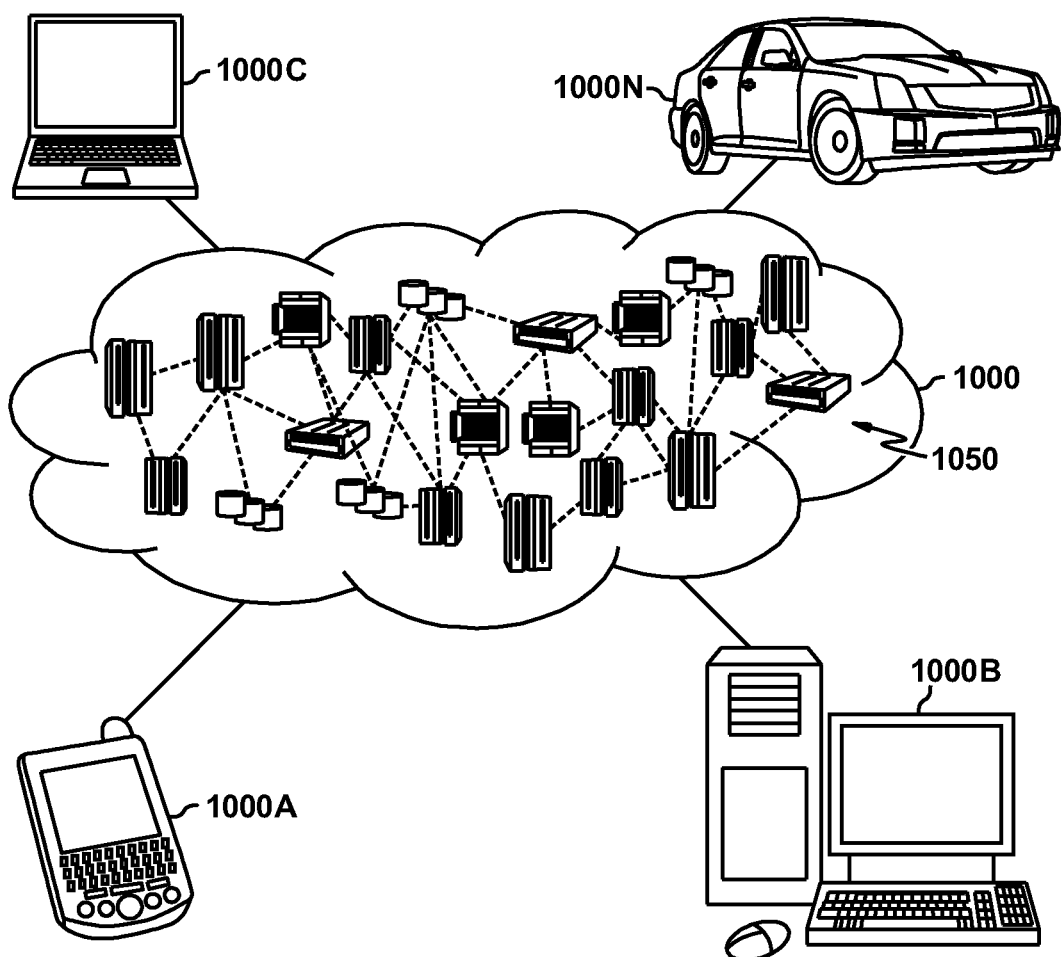
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1050 and cloud computing environment 1000 can communicate with any type of computerized device over any type of network and/or network addressable connection (e.g., using a web browser).

Figure 6:
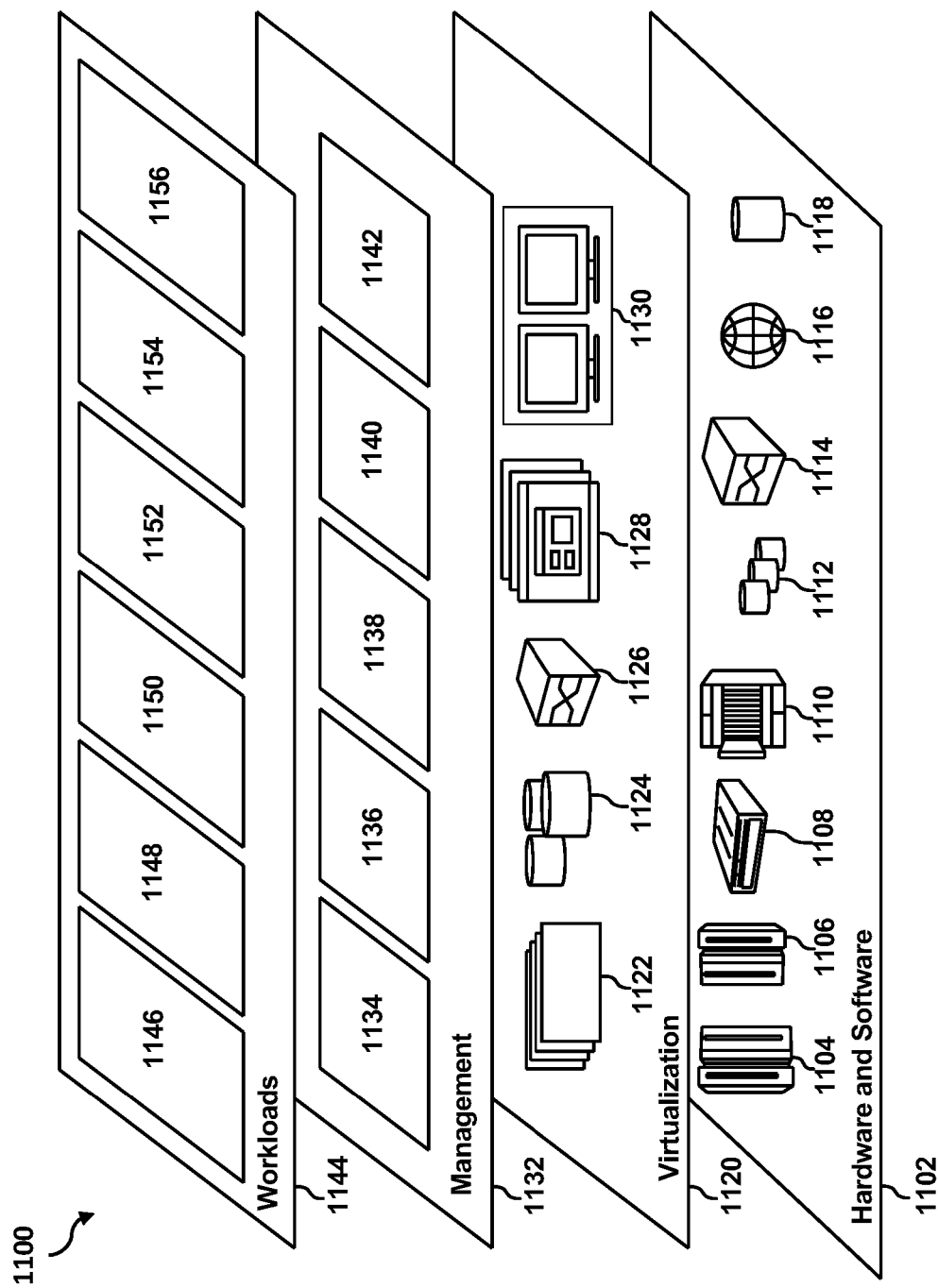
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and outage restoration prediction 1156. An outage restoration prediction program 110a, 110b provides a way to provide optimal solutions for the recovery efforts during a weather event.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restoration time predictions and optimized recovery solutions, the method comprising:
    automatically retrieving, from one or more databases, historical and real-time data associated with a plurality of computing devices, wherein the retrieved historical and real-time data comprises structured and unstructured data associated with one or more natural emergency events;
    based on the retrieved historical and real-time data, automatically selecting a dataset based on time series data associated with a natural emergency event, wherein the time series data includes multiple variables and environmental analyzer data that are used as measurement vectors in one or more algorithms for determining an output restoration time, wherein the environmental analyzer data further comprises, at least in part, a type of outage, and wherein at least one variable associated with the multiple variables comprises lifetime data of each equipment selected for restoring an outage area;
    based on the dataset, automatically training and building one or more models by incorporating the multiple variables and the environmental analyzer data using natural language processing and machine learning, wherein the one or more models include a classification and regression tree model, a cross validated decision tree model or a bootstrap aggregating model;
    selecting a model for predictions using the one or more algorithms and decision trees to reduce a variance of the model;
    rebuilding the model based on additional data attributes;
    determining, using the model, an outage prioritization for each outage node; and
    transmitting results of the outage prioritization.

2. The method of claim 1, wherein the time series data includes restoration time data from past restoration data for a given geographical location, wherein R is a predictor response variable that identifies past estimated restoration times.

3. The method of claim 1, wherein the environmental analyzer data further includes a storm category, a location, a storm duration, crew availability, stock availability, a first waiting time, a second waiting time and an actual restoration time.

4. The method of claim 1, wherein the classification and regression tree model predicts an outage recovery time based on the multiple variables, the cross validated decision tree model allows an analysis by alternating between a training dataset and a testing dataset, wherein the bootstrap aggregating model uses a statistical classification and a regression analysis to improve prediction accuracy.

5. The method of claim 1, wherein the model is selected for a prediction based on a minimization of a mean square error or by using a cross validation.

6. The method of claim 1, wherein the additional data attributes include collected data based on damage at a beginning of a storm and damage as the storm recedes.

7. The method of claim 1, wherein the outage prioritization is determined using a genetic algorithm or an annealing technique.

8. A computer system for restoration time predictions and optimized recovery solutions, comprising:
    one or more processor, one or more computer-readable memories, one or more computer-readable tangible storage media, and program instructions stored on at least one of the one or more computer-readable tangible storage media for execution by at least one of the one or more processor via at least one of the one or more computer-readable memories, wherein the computer system is capable of performing a method comprising:
    automatically retrieving, from one or more databases, historical and real-time data associated with a plurality of computing devices, wherein the retrieved historical and real-time data comprises structured and unstructured data associated with one or more natural emergency events:
    based on the retrieved historical and real-time data, automatically selecting a dataset based on time series data associated with a natural emergency event, wherein the time series data includes multiple variables and environmental analyzer data that are used as measurement vectors in one or more algorithms for determining an output restoration time, wherein the environmental analyzer data further comprises, at least in part, a type of outage, and wherein at least one variable associated with the multiple variables comprises lifetime data of each equipment selected for restoring an outage area;
    based on the dataset, automatically training and building one or more models by incorporating the multiple variables and the environmental analyzer data using natural language processing and machine learning, wherein the one or more models include a classification and regression tree model, a cross validated decision tree model or a bootstrap aggregating model;

selecting a model for predictions using the one or more algorithms and decision trees to reduce a variance of the model;

rebuilding the model based on additional data attributes;

determining, using the model, an outage prioritization for each outage node; and transmitting results of the outage prioritization.

9. The computer system of claim 8, wherein the time series data includes restoration time data from past restoration data for a given geographical location, wherein R is a predictor response variable that identifies past estimated restoration times.

10. The computer system of claim 8, wherein the environmental analyzer data further includes a storm category, a location, a storm duration, crew availability, stock availability, a first waiting time, a second waiting time and an actual restoration time.

11. The computer system of claim 8, wherein the classification and regression tree model predicts an outage recovery time based on the multiple variables, the cross validated decision tree model allows an analysis by alternating between a training dataset and a testing dataset, wherein the bootstrap aggregating model uses a statistical classification and a regression analysis to improve prediction accuracy.

12. The computer system of claim 8, wherein the model is selected for a prediction based on a minimization of a mean square error or by using a cross validation.

13. The computer system of claim 8, wherein the additional data attributes include collected data based on damage at a beginning of a storm and damage as the storm recedes.

14. The computer system of claim 8, wherein the outage prioritization is determined using a genetic algorithm or an annealing technique.

15. A computer program product for restoration time predictions and optimized recovery solutions, comprising:
one or more computer-readable tangible storage media and program instructions stored on at least one of the one or more computer-readable tangible storage media, the program instructions executable by a processor to cause the processor to perform a method comprising:

automatically retrieving, from one or more databases, historical and real-time data associated with a plurality of computing devices, wherein the retrieved historical and real-time data comprises structured and unstructured data associated with one or more natural emergency events:

based on the retrieved historical and real-time data, automatically selecting a dataset based on time series data associated with a natural emergency event, wherein the time series data includes multiple variables and environmental analyzer data that are used as measurement vectors in one or more algorithms for determining an output restoration time, wherein the environmental analyzer data further comprises, at least in part, a type of outage, and wherein at least one variable associated with the multiple variables comprises lifetime data of each equipment selected for restoring an outage area;

based on the dataset, automatically building one or more models by incorporating the multiple variables and the environmental analyzer data using natural language processing and machine learning, wherein the one or more models include a classification and regression tree model, a cross validated decision tree model or a bootstrap aggregating model;

selecting a model for predictions using the one or more algorithms and decision trees to reduce a variance of the model;

rebuilding the model based on additional data attributes;

determining, using the model, an outage prioritization for each outage node; and transmitting results of the outage prioritization.

16. The computer program product of claim 15, wherein the time series data includes restoration time data from past restoration data for a given geographical location, wherein R is a predictor response variable that identifies past estimated restoration times.

17. The computer program product of claim 15, wherein the environmental analyzer data further includes a storm category, a location, a storm duration, crew availability, stock availability, a first waiting time, a second waiting time and an actual restoration time.

18. The computer program product of claim 15, wherein the classification and regression tree model predicts an outage recovery time based on the multiple variables, the cross validated decision tree model allows an analysis by alternating between a training dataset and a testing dataset, wherein the bootstrap aggregating model uses a statistical classification and a regression analysis to improve prediction accuracy.

19. The computer program product of claim 15, wherein the model is selected for a prediction based on a minimization of a mean square error or by using a cross validation.

20. The computer program product of claim 15, wherein the additional data attributes include collected data based on damage at a beginning of a storm and damage as the storm recedes.

* * * * *